United States Patent [19]

Risner et al.

[11] Patent Number: 4,474,527

[45] Date of Patent: Oct. 2, 1984

[54] OPTIONAL MANUAL GRAVITY WHEELCHAIR LIFT

[75] Inventors: Melvin G. Risner, Carey; William D. Sherman, Upper Sandusky; Raymond L. Smalley, Carey, all of Ohio

[73] Assignee: REB Manufacturing, Inc., Carey, Ohio

[21] Appl. No.: 392,278

[22] Filed: Jun. 25, 1982

[51] Int. Cl.[3] .............................................. B60P 1/46

[52] U.S. Cl. .............................. 414/540; 414/629; 414/921

[58] Field of Search ............ 414/539, 540, 628, 629, 414/921

[56] References Cited

U.S. PATENT DOCUMENTS

| | | | |
|---|---|---|---|
| 2,418,494 | 4/1947 | Anthony et al. | 187/17 |
| 2,701,068 | 2/1955 | Douglas et al. | 244/137 R |
| 2,761,571 | 9/1956 | Adams | 414/140 |
| 3,233,758 | 2/1966 | Darfus | 213/19 |
| 3,451,572 | 6/1969 | Rossoni | 414/498 |
| 3,739,929 | 6/1973 | McRobert | 414/420 |
| 3,918,596 | 11/1975 | Ward | 414/545 |
| 3,968,890 | 7/1976 | Robson | 414/540 |
| 4,015,725 | 4/1977 | Ryan et al. | 414/539 |
| 4,039,091 | 8/1977 | Adamski et al. | 414/556 |
| 4,056,203 | 11/1977 | Meldahl et al. | 414/540 |
| 4,113,121 | 9/1978 | Collins et al. | 414/921 X |
| 4,121,695 | 10/1978 | Carpenter | 414/539 |
| 4,124,096 | 11/1978 | Dudynskyj et al. | 187/9 R |
| 4,124,097 | 11/1978 | Hawks et al. | 187/9 R |
| 4,124,100 | 11/1978 | Hawks | 187/9 R |
| 4,138,023 | 2/1979 | Rohrs et al. | 414/921 X |
| 4,265,586 | 5/1981 | Couture | 414/545 |
| 4,270,630 | 6/1981 | Karkau | 187/9 R |

OTHER PUBLICATIONS

"Saf-T-Lift" by Collins, Apr. 14, 1978.

*Primary Examiner*—Robert J. Spar
*Assistant Examiner*—Ken Muncy
*Attorney, Agent, or Firm*—Hugh Adam Kirk

[57] ABSTRACT

A wheelchair lift such as for vehicles, comprising a stationary outer rectangular frame across the top of which swings an inner rectangular telescopic frame, the lower telescoping end of which has a foldable platform for the wheelchair. The inner frame swings out to clear the side of the vehicle, which swinging movement is limited by a pair of toggles that support a bridging platform between the lift platform and the floor of the vehicle. An electric motor-driven hydraulic pump, valve, and accumulator assembly provides the power for lifting the platform by telescoping the inner frame parts, and a valve in the hydraulic system damps the lowering of the platform. The folding of the platform from a vertical to a horizontal position and swinging of the inner frame may be done manually or by a separate reciprocating motor mounted on the upper telescopic frame.

2 Claims, 7 Drawing Figures

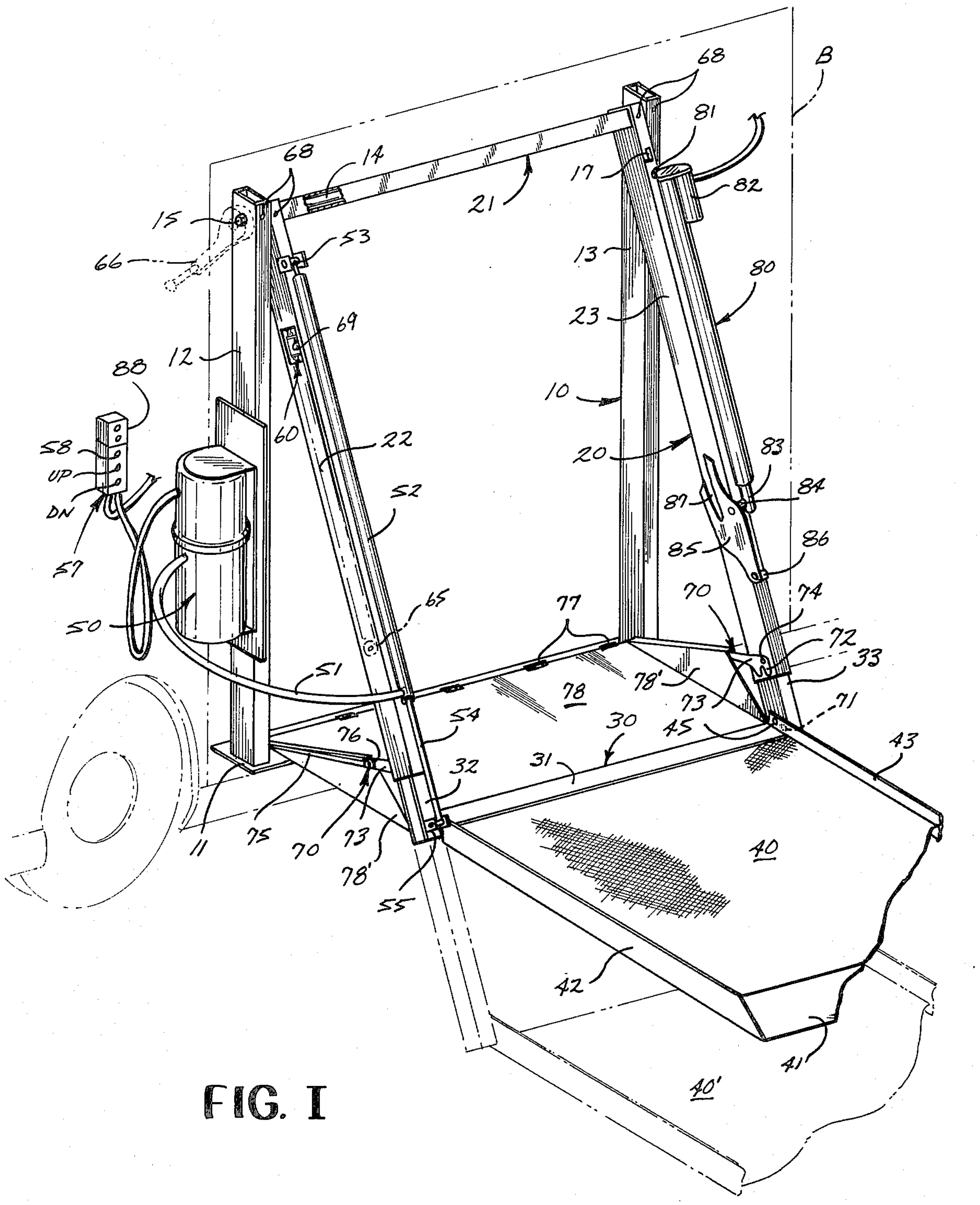
FIG. I

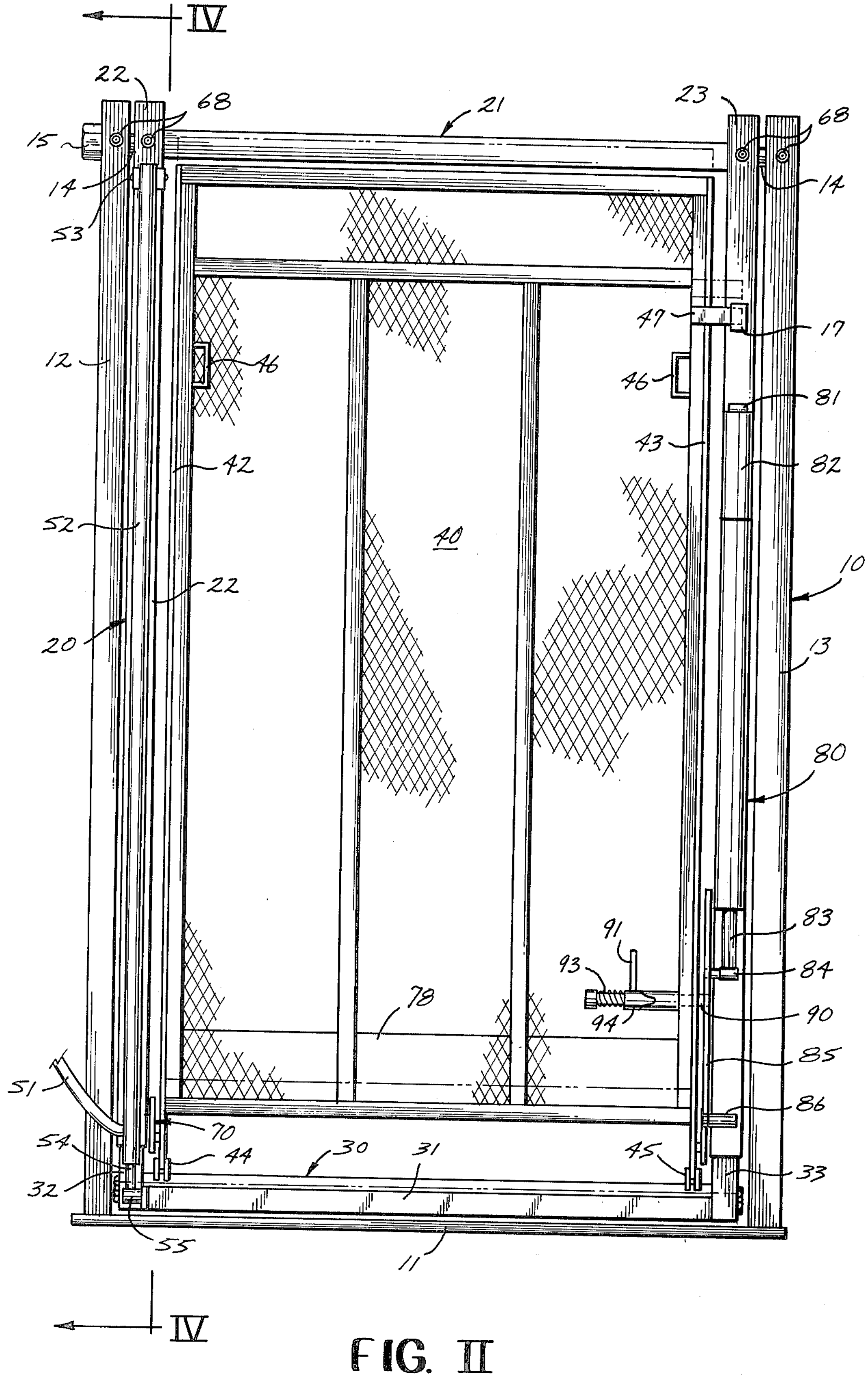
FIG. II

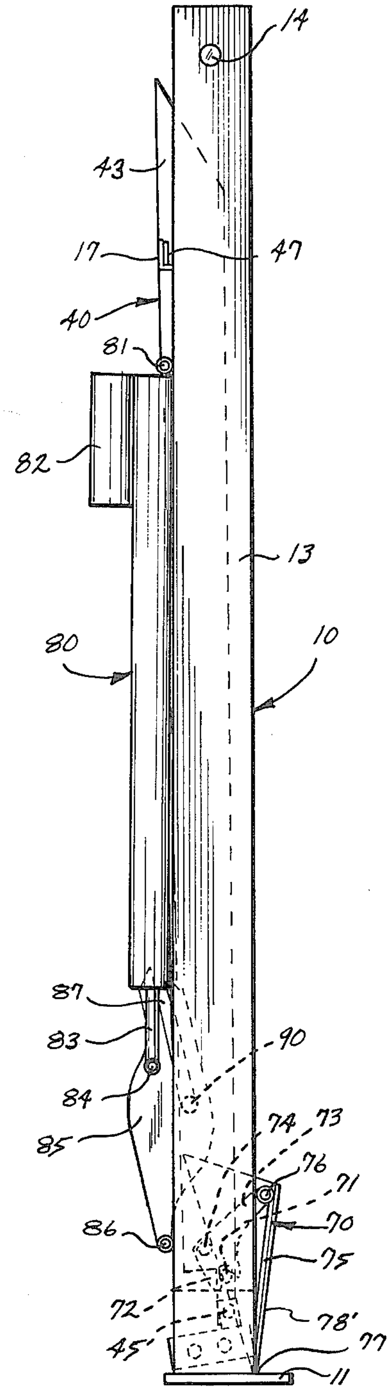
FIG. III
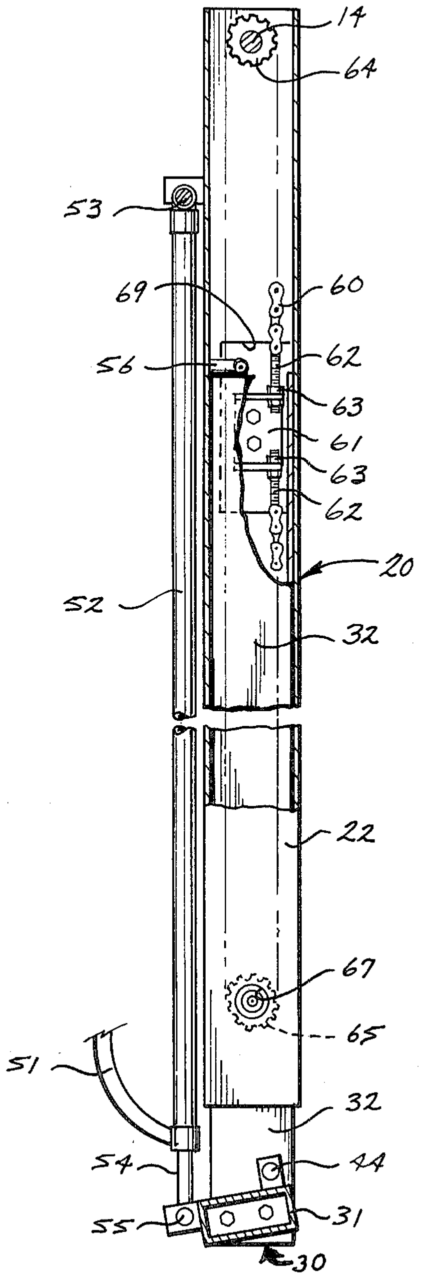
FIG. IV

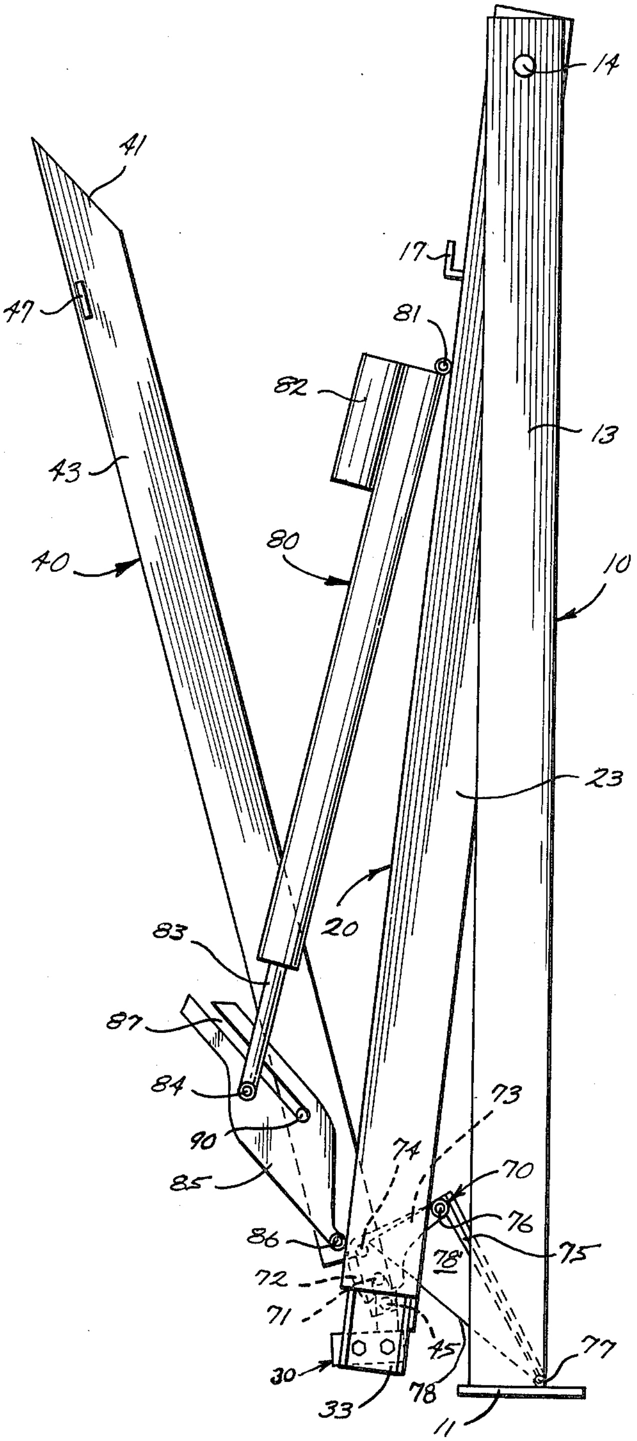
FIG. V

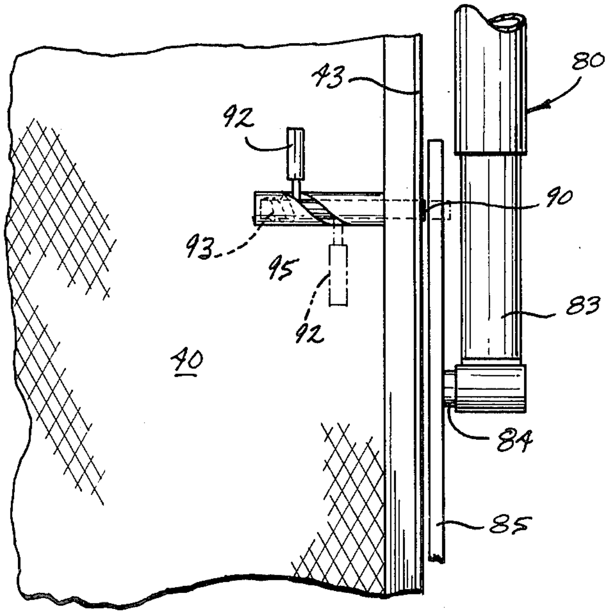
FIG. VII
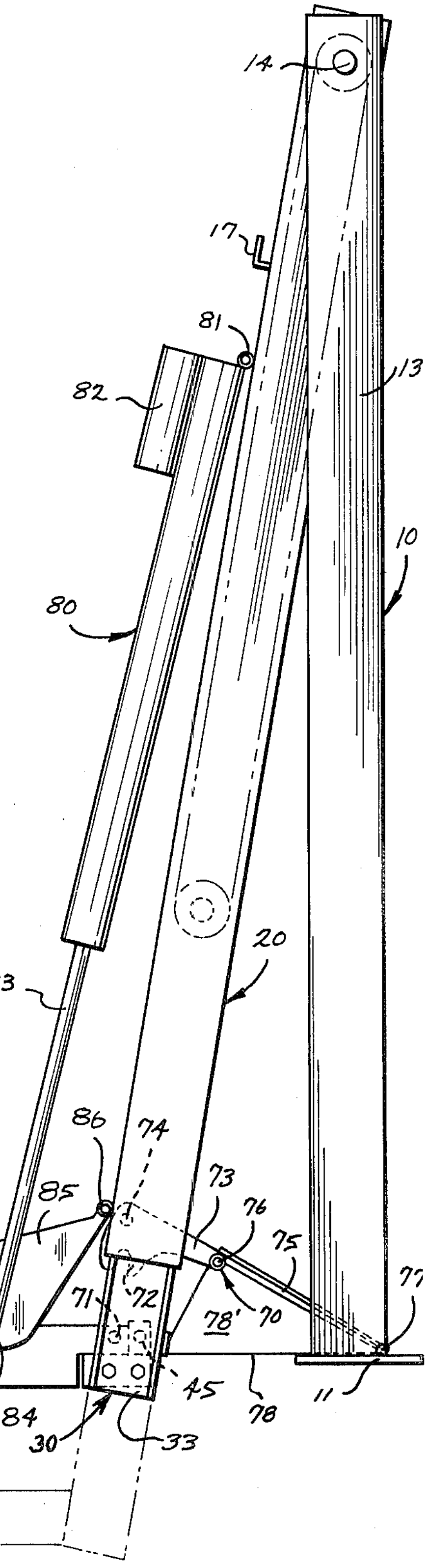
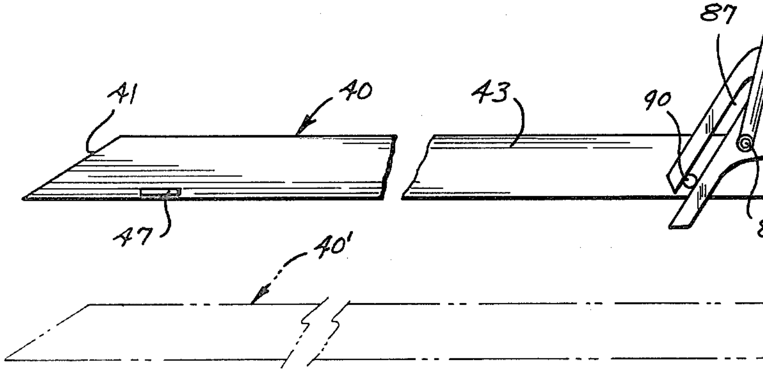
FIG. VI

OPTIONAL MANUAL GRAVITY WHEELCHAIR LIFT

BACKGROUND OF THE INVENTION

This is an improvement in Meldahl et al U.S. Pat. No. 4,056,203 issued Nov. 1, 1977.

Previously, such wheelchair lifts for vehicles have been substantially completely power-operated for both raising and lowering the platform, as well as the folding of the platform from a vertical to horizontal position, and vice versa, and the moving or swinging of the platform outwardly free of the vehicle, all requiring expensive equipment on and additional power from the vehicle.

OBJECTS AND ADVANTAGES

It is an object to produce a simple, efficient, effective, economic, and durable wheelchair lift such as for vehicles, which has much less power drain for its operation from the power sources in the vehicle.

Another object of this invention to produce a wheelchair vehicle lift which conserves energy and employs gravity as much as possible for its operation.

Another object of this invention is to produce such a wheelchair lift which can be completely manually operated in the event of failure of any or all of the mechanical, hydraulic, and/or electrical power systems that may be employed therein.

SUMMARY OF THE INVENTION

Generally speaking, the gravity lift of this invention comprises a rectangular stationary outer vertical frame from the top of which is suspended a limited swinging inner frame having a telescopic lower section to which a platform is hinged for supporting a wheelchair. The inner frame swings outwardly at its bottom, and the lower section telescopes to raise and lower the platform. The mechanism for raising and lowering the platform may comprise an electrically-driven hydraulic motor and hydraulic system wherein the motor is powered only for raising the platform and the hydraulic system is employed for dampening the lowering of the platform under gravity.

The movement of the platform from its vertical stored position to its horizontal position by means of a hook and pin engagement to toggle links between the lower ends of the inner and outer frames, swings the inner frame into its outward position so that the platform when lowered will clear the wall in which it is mounted. This hinging of the platform from vertical to horizontal position, and vice versa, may be done either manually or by a separate reciprocating motor which may be manually engaged or disengaged, as desired. This reciprocating motor may be either an electrical screw type or may be hydraulic-driven from the hydraulic system for raising and lowering the platform.

Sprocket wheels are keyed to the ends of the common swinging shaft for supporting the inner telescoping frame, around which sprocket chains which extend in and along each side of the inner frame and are connected to the lower telescopic frame, insuring uniform vertical movement of the lower telescoping frame, as well as permitting manual raising and lowering of this lower telescopic frame by placing a crank on an end of the inner frame supporting shaft.

A latch means is provided for maintaining the platform in its stored vertical position, and the hydraulic lifting mechanism is employed for engagement and disengagement of the platform with this latch means.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. I is a perspective view of a preferred embodiment of the lift of this invention installed in the side wall of a van or bus vehicle, which lift is shown in full lines in its operative position for loading and unloading a wheelchair from the vehicle, and in dotted lines with the platform in its lowered position for receiving or discharging a wheelchair from outside the vehicle;

FIG. II is a front elevational view of the lift shown in FIG. I in the side wall of the vehicle in the lift's inoperative or stored position with the platform folded vertically and the inner frame swung inwardly, and showing the latching means for the platform and the means for disconnecting the reciprocating motor for folding the platform;

FIG. III is a right side elevation of the folded lift shown in FIG. II;

FIG. IV is a section taken along lines IV—IV of FIG. II in the direction of the arrows, with parts broken away showing the sprocket chain connection to the inner lower telescopic frame;

FIG. V is a view similar to FIG. III showing the platform being unfolded from its vertical toward its horizontal position, and the swinging of the bottom of the inner frame out from the outer stationary frame;

FIG. VI is a side elevation similar to FIGS. III and V, but showing the platform in its operative horizontal position as in FIG. I; and FIG. VII is an enlarged view of another embodiment of a manual latching mechanism between the platform and its operating reciprocating motor, shown unlatched in full lines and latched in dotted lines.

DETAILED DESCRIPTION OF PREFERRED EMBODIMENTS

Referring first to FIGS. I and II, there is shown a wheelchair-type lift for a vehicle, such as for a van or bus B in FIG. I, a vertical side wall of which vehicle has an opening surrounded by a stationary or rigid rectangular outer frame 10 comprising a base plate 11, two vertically parallel sides 12 and 13, and a top shaft 14, at least one outer end of which is provided with an irregular surface 15 to which a wrench or crank 66 may be attached for rotating the shaft. This shaft is thus journalled in the upper ends of the two columns or pillars 12 and 13, and swingably supports a rectangular inner frame 20 comprising an upper inverted U-shaped section 21 and depending parallel leg portions 22 and 23, respectively, all three of which portions or sections of the "U" section 21 are hollow and herein shown to have rectangular cross-sectional areas. Through the base of this "U" section 21, the shaft 14 extends and the upper ends of the legs 22 and 23 are free to oscillate on this shaft 14. Depending and telescoping into the legs 22 and 23 is the lower telescopic inner rectangular U-shaped frame section 30 having a base bar 31 and parallel telescoping legs 32 and 33, which telescope into the leg portions 22 and 23, respectively.

Pivoted to the lower end of the lower telescopic frame 30 is a platform 40 with a front ramp 41, parallel side rails or flanges 42 and 43, the inner ends of which rails have aligned pivots 44 and 45 above the base 31 of the telescopic frame section 30 and near its inner or rearward edge.

In order to raise the platform 40 from its dotted line position 40' shown in FIGS. I and VI, there is provided an electric motor and pump assembly 50 (see FIG. I) which may preferably be mounted to the frame 10 such as to one of its columns 12, which assembly 50 includes an accumulator and hydraulic hose connection 51 to a hydraulic reciprocating motor 52 anchored such as by pivot pin 53 at its upper end to one of the depending legs 22 of the inner frame 21, and having its extendable piston 54 connected to the lower end of the lower telescopic U-frame 30 such as by means of a pivot pin 55. The duct 51 is only connected to the lower end of the cylinder 52 of the hydraulic reciprocating motor so that the power source 50 is only employed in lifting the inner lower telescopic frame 30 and its associated platform 40 and not lowering it, which lowering is controlled automatically by the operation of a solenoid valve or preset valve inside the housing of the motor pump assembly 50 to dampen or control the downward speed of the platform by the pull of gravity thereon.

Since only one power source need to be employed in this lift, namely the hydraulic system of motor pump 50 and reciprocating motor 52, and this source is attached only to one side of the inner rectangular frame 20, in order to insure that both sides or legs 32 and 33 of the telescopic frame move in unison by the action of the piston 54 connected to only one leg 32 thereof, reference is had to FIG. IV in which there is shown inside the rectangular housing of the depending legs 22 and 23, sprocket chains 60 in each leg, each of which chains is connected to the upper end of its associated lower telescoping U-shaped member 30, such as by means of a flanged plate 61 through tension-adjustable screws and nuts 62 and 63, which chains 60 pass over upper sprocket wheels 64 keyed to near opposite ends of the shaft 14 and thence down around lower sprocket wheels 65 journalled near the lower ends of the legs 22 and 23 of the upper inner swinging frame 21 and thence back to the brackets 61. Thus, any movement of one of the legs is positively transmitted via the sprocket chain 60, sprocket wheel 64 and shaft 14 to the other leg of the telescoping frame so that both legs 32 and 33 move up and down exactly the same distance at the same time and will not become askew. Furthermore, since the sprocket wheels 64 of these chains are keyed to the shaft 14 and this shaft 14 is provided at at least one end thereof with a welded nut or an irregular surface 15 for a wrench or crank 66, in the event of failure of the hydraulic or electric system 50, the platform 40 still may be manually raised or lowered manually by the crank 66 (shown in dotted lines in FIG. I). Also there are provided apertures in the frames 20 and 30, such as 67, 68 and 69, so that easy access may be had to the sprocket chains, sprocket wheels or gears, and bearings for their shafts and the shaft 14 for lubrication and adjustment purposes.

Since the lower end of inner frame 20 swings outwardly from the stationary outer frame 10, in order to clear the side of the vehicle wall so that the platform 40 can be raised and lowered, there is provided a toggle mechanism 70 as shown in FIGS. I, III, V and VI, engageable with the platform 40 so that when the platform 40 is moved from its closed inoperative or vertical position as shown in FIGS. II and III into its operative or horizontal position shown in FIGS. I and VI, a pin 71 on one or both of the flanges 42 and 43 of the pivoted platform spaced away from the pivots 45 thereon, engages a slotted hook 72 at the outer end of the outer toggle lever 73 below its pivot 74 to the lower end of the upper inner frame leg 22 and/or 23 so that the pin 71 when moved by the manual (or power) oscillation of the platform 40 will operate the toggle links 70 to push out the lower end of the inner swinging frame 20, a distance limited by the toggle mechanism 70 (see FIGS. I and VI) to maintain the outward position of the inner frame during raising and lowering of the platform 40. The inner link 75 of the toggle mechanism 70 which is pivoted at its outer end 76 to the inner end of the link 73 and at its inner end at 77 to a pivot adjacent the crossbar 11 at the lower end of the pillar 12 or 13, also supports by means of end flanges 78' a bridging plate 78 hinged at 77 to the bar 11 for bridging the gap between the edge of the vehicle and the swung-out end of the inner frame, namely base 31 thereof (see FIG. I).

The operation of this toggle mechanism 70 is shown from its vertical stored inoperative position for the platform 40 in FIG. III to its partial open position shown in FIG. V and to its full open or operative position shown in FIG. VI. Similarly, when the platform 40 is raised or oscillated around its hinge pivot 45 from its operative to its inoperative position, the toggle mechanism 70 is broken and folded by the operation of the pin 71 in the hook slot 72 of the lever 73, which breaks the pivoted toggle joint 76 between the lever 73 and 75 as shown in FIG. V so that these levers 73 and 75 can be folded up into the position shown in FIG. III. Although the bridging member 78 is freely hinged at its hinge 77, it is so balanced as shown in FIG. III by gravity that it always rests in a position so that as soon as the lever 75 moves downwardly from that position around its pivot 77, the bridge plate 78 will follow its motion. Thus the extended flange 78' or triangular-shaped gusset with its upper flange edge that hangs on the lever 75 permit the gravity operation at all times of the bridging plate 78.

The movement of the platform 40 from its vertical to its horizontal position as described so far is conducted manually, and separate handles 46 (see FIG. II) may be provided on either or both undersides of the platform 40 to aid in this operation. In this respect, the mechanism and toggle mechanism 70 are so constructed that once the upper end of the platform has its tab 47 unhooked from the fixed hook 17 on one or both sides of the stationary frame 10 (see dotted line position in FIG. II), the platform by gravity angles out somewhere between 20° and 30° about as shown in FIG. V and thence may be moved by grabbing onto the handles 46 and moved into its full horizontal position shown in FIG. VI. In order to unhook the platform tab 47 from its retaining hook 17, the power mechanism 50 is operated to override the limit switch 56 (see FIG IV) which automatically stops the operation of the reciprocating motor 52 when the platform 40 becomes level with the bridging plate 78 and floor inside the vehicle. This limit switch 56 is shown mounted inside the leg 22 of upper inner frame section 21 to engage the upper end of the leg 32 of the lower telescopic section 30. Thus the control box 57 of the electric motor for the drive mechanism 50 is provided with an additional override switch 58 from the up-and-down buttons UP and DN thereon, so as to lift the lower telescopic section 30 of the inner frame 20 and its platform 40 when in the position of FIG. III another inch or so to be sure that the platform lug 47 can be lifted up from behind the hook 17. Similarly, when the platform 40 is to be locked in its vertical storage position shown in FIGS. II and III, the same override button 58 must be pressed so that the platform will be raised sufficiently so the tab 47 can be moved over and then fall behind the hook 17.

In the event manual folding of the platform 40 is not desirable, there may be provided an additional reciprocating motor means 80 for oscillating the platform 40 and simulatneously by means of the pin 71 and toggle mechanism 70 above described, swing the inner frame 20 outwardly into its operative position as shown in FIGS. I and VI. This additional reciprocating motor mechanism 80 which may be pivotally attached to the other leg 23 at 81 near its upper end and may be hydraulically operated or as shown herein operated by an electric motor 82 and comprise a screw which reciprocates a rod 83 which is pivotally connected at 84 to a slotted lever 85, which lever 85 is pivoted at 86 to the lower end of the leg 23 of upper inverted U-shaped section of the inner frame 20. The open end longitudinal slot 87 in the lever 85 is to engage a manually retractable pin 90 that can be moved longitudinally into and out of this slot by means of a lever mechanism 91 or 92 (see FIG. VII) against the action of a helical spring 93. The difference between the mechanisms for operating the pin 90 as shown in FIGS. II and VII, is in the two different types of cams, one being a split cylindrical lobe-type cam 94 shown in FIG. II, and the other being a helical slot-type cam 95 shown in FIG. VII. This pin 90 is mounted under the platform 40 and thus by its operation from its full line position into its dotted line position shown in FIG. VII and vice versa in FIG. II, can adapt the lift of this invention to become more or less dependent on external power versus manual operation. Thus, when the pin 90 is in engagement in the slot 87, operation of the motor 81, such as by additional buttons on an additional control box 88 to box 57 as shown in FIG. I, will enable complete power operation of the platform 40 from its fully closed vertical position shown in FIG. III to its fully open horizontal position shown in FIGS. I and VI, and during this movement also, via the toggle mechanism 70, swing the lower end of the inner frame 20 into its operative position as shown in FIGS. I and VI, and back into its inoperative position as shown in FIGS. II and III.

It is to be understood that the shapes of the levers and these slots and/or hooks and the locations of their pivots as disclosed in this invention may be varied, depending upon the weights of the parts and the angles they are to move manually, by gravity, or by power. Also different types of locking and latching mechanisms, such as those shown in FIGS. II and VII may be replaced by other types of locks or latches without departing from the scope of this invention.

Furthermore, it is to be understood that the front ramp portion 41 of the platform 40, may and preferably should include a barrier plate to prevent the wheelchair from rolling off the platform once it is raised from the ground. Such a mechanism may be incorporated in a pivoted ramp that may be operated by a lever and/or spring mechanism to maintain it in a barrier position as long as the platform is not resting on the ground.

While there is described above the principles of this invention in connection with specific apparatus, it is to be clearly understood that this description is made only by way of example and not as a limitation to the scope of this invention.

We claim:

1. A platform lift for a vehicle comprising:

(A) a vertical outer frame fixedly attached to a wall of the vehicle, (B) a horizontal axle across the upper portion of said outer frame, (C) an inner frame having upper and lower telescopic portions, said upper portion pivoted on said axle for suspending said inner frame for swinging outwardly from the wall of the vehicle, (D) a first reciprocating motor connected outside of and between said upper and lower telescopic portions for lowering and positively raising the lower telescopic portion when said inner frame is swung outwardly from said outer frame, (E) wheels inside said telescoping portions for insuring uniform relative movement between said telescoping portions, (F) a platform hinged to said lower telescopic portion for oscillation between a vertical and horizontal position, (G) second reciprocating motor means for oscillating said platform when said lower telescopic portion is in its raised position, said oscillating means being attached to said upper telescopic portion, (H) means for supplying and controlling the power to said motors, said supplying and controlling means for said first motor comprising a single power duct, (I) manual means on said platform for connecting and disconnecting said oscillating means to said platform, (J) toggle link means between the lower ends of said outer frame and said upper portion of said inner frame for limiting the outward swinging movement of said inner frame, (K) bridging means supported by said toggle link means for bridging a gap between the bottom of said inner and outer frames when said inner frame is swung into its outer position, (L) means on said platform for engaging said toggle link means to swing said inner frame into its outer position when said platform is moved from its vertical to its horizontal position and vice versa, (M) cooperating means between said platform and said outer frame for locking said platform into its vertical position, and (N) means for operating said first reciprocating motor for raising said platform when said platform is in its vertical position for locking and unlocking said cooperating means.

2. A platform lift according to claim 1 including: parallel sprocket chains along opposite sides of said upper telescoping portion and connected to said lower telescoping portion, said wheels comprising sprocket wheels keyed to opposite ends of said axle for driving said sprocket chains, and means on said axle for permitting manual movement of said lower telescoping portion by rotation of said axle in the event said motor does not operate.

* * * * *